United States Patent Office 3,364,781
Patented Jan. 23, 1968

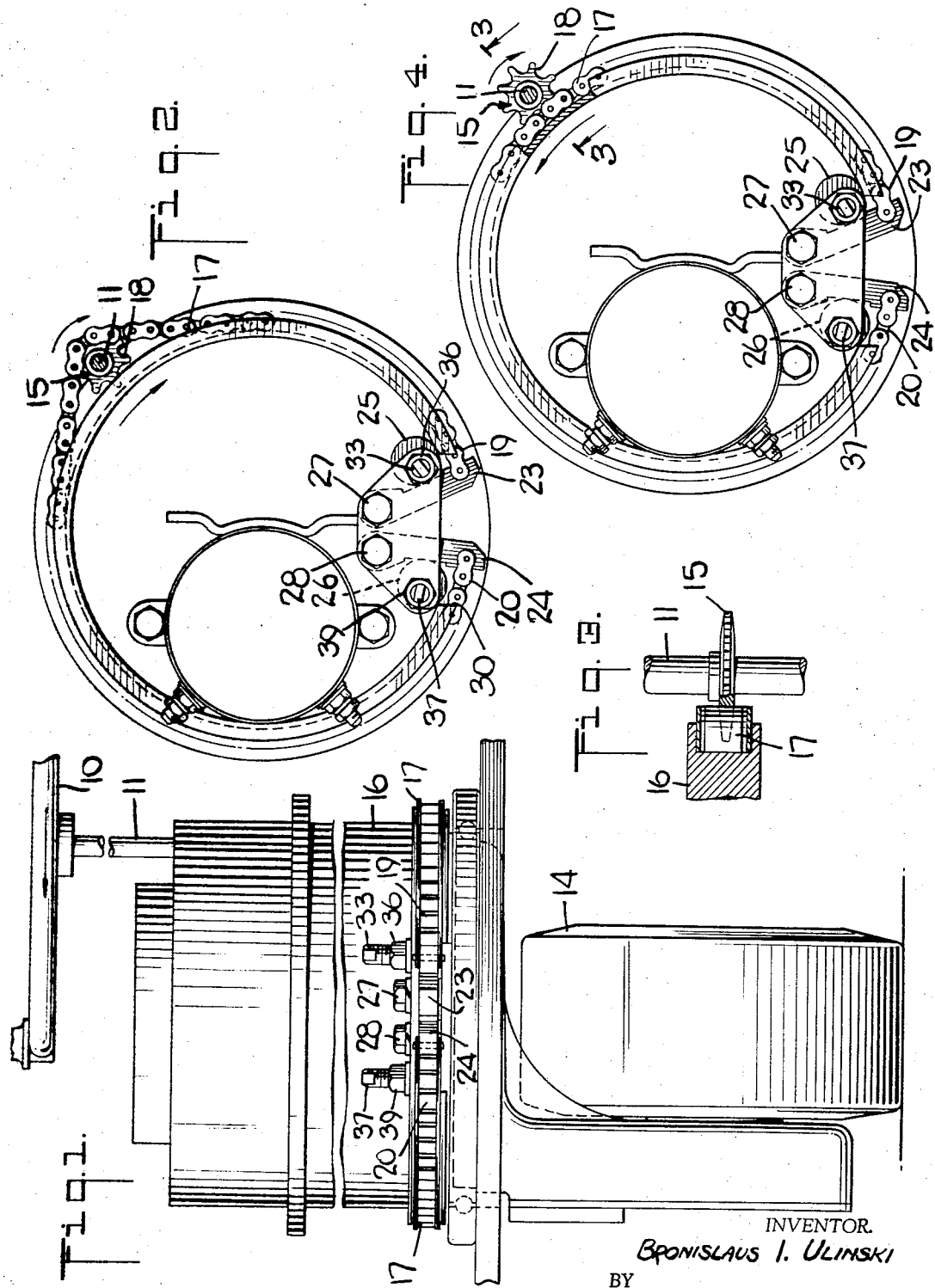

3,364,781
CHAIN STEERING ARRANGEMENT FOR
INDUSTRIAL TRUCKS
Bronislaus I. Ulinski, Jenkintown, Pa., assignor to Yale &
Towne, Inc., Cleveland, Ohio, a corporation of Ohio
Filed Oct. 5, 1965, Ser. No. 493,070
6 Claims. (Cl. 74—496)

ABSTRACT OF THE DISCLOSURE

A vehicle road-wheel steered by an operator's steering wheel through a chain and pinion arranged for quick and easy reversibility of the direction in which the road wheel turns for a given direction of rotation of the steering wheel. Such reversibility is obtained by positioning the chain either between or around the pinion and a sheave attached to the vehicle road wheel.

---

This invention relates to an industrial truck and in particular to a steering system for an industrial truck of the type having a steerable truck wheel steered by the operator through a chain and pinion drive.

In an industrial truck of this type, a steerable wheel is commonly steered through chain and pinion drives, including sheaves connected to the steerable wheel and rotatable with these wheels in the steering axis. Thus, a driving pinion is connected with the steering wheel and a chain connects the driving pinion to the steerable truck wheel. Such an arrangement permits the steering system to be easily adapted to the limited space available on such a truck. At the same time, the system provides a mechanical advantage between the steering wheel and the steerable truck wheel to facilitate steering of the truck.

However, such an arrangement presents a problem in that the steering system does not allow a reversal in the direction of turning of the truck for a given directional rotation of the operator's steering wheel. Thus, once such system is installed in the truck, the truck will turn, for example, to the right upon clockwise rotation of the steering wheel and to the left upon counterclockwise rotation of the steering wheel. The purpose of my invention is to provide a steering arrangement having all of the advantages of the prior art, but which at the same time can be quickly and easily changed to provide for reversal of the direction in which the truck turns for a given direction of rotation of the steering wheel.

To this end, my invention includes a sheave secured to a steerable wheel and driven by a flexible drive element or chain and a pinion. The pinion is positioned adjacent the periphery of the sheave and adapted to be rotated by the steering wheel. With this arrangement, a reversal of the direction of steering is obtained by positioning the chain either between the pinion and sheave or around the pinion and sheave to provide for selective reversal of the direction of turning of the truck relative to a given direction of rotation of the steering wheel.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings:

FIGURE 1 is an elevational view of a steering system constructed in accordance with the invention.

FIGURE 2 is a plan view with parts broken away of the steering system shown in FIGURE 1.

FIGURE 3 is a sectional view taken along the line 3—3 of FIGURE 4.

FIGURE 4 is a view similar to FIGURE 2 but showing the system arranged for rotation of the steerable wheel in a direction opposite from that shown in FIGURE 2.

Referring to the drawings, and in particular to FIGURE 1, there is shown a steering system constructed in accordance with the invention. To facilitate explanation, the steering system is shown disassociated with the other truck structure.

The steering system includes a steering handle or wheel 10 secured to a vertically extending steering shaft 11 which is attached to the truck frame by suitable bearings to support the shaft 11 for rotation. The lower end of the shaft 11 is connected to a steerable, ground engaging wheel 14 by means of a chain drive including a chain sprocket or pinion gear 15 secured to the lower end of shaft 11, a sheave 16 which is secured to the wheel 14 and a chain 17 which interconnects the pinion gear 15 and the sheave 16. The wheel 14 and the sheave 16 are suitably mounted for steering rotation about a vertical axis relative to the truck frame by means of a suitable bearing. The pinion gear 15 and shaft 11 are supported in an axis of rotation such that the teeth 18 of the pinion gear are just out of contact or in juxtaposition with the vertical peripheral surface 19 of the sheave 16 as shown in FIGURES 2 and 3 of the drawings.

The chain 17 is made noncontinuous, or of a fixed length, and the free ends of the chain 19 and 20 are adjustably connected to the sheave 16 through levers 23 and 24, best shown in FIGURE 2, which are pivotally attached to the sheave 16. Adjustments in the pivotal positions of the levers 23 and 24, and therefore the point of connection of the ends of the chain 17 to the sheave 16 may be quickly and easily made through rotation of adjusting cams 25 and 26 which engage the levers 23 and 24. The levers 23 and 24 are pivotally attached to the sheave 16 through the bolts 27 and 28, which are threaded to the sheave 16. The sheave 16 is cut away at 30 to allow the outer ends of the levers 23 and 24 to extend outwardly of the sheave 16 and the ends 19 and 20 of the chain are pivotally attached by means of a pin to the outer end of each of the levers.

The cam 25 is formed integrally with or secured to a screw 33 whereby the screw 33 thereby rotates the cam 25 to adjust the pivotal position of the lever 23. The cam 25 is adapted to be locked in adjusted position by a locking nut 36 which is threaded on the screw 33. Similarly, the cam 26 is secured to a screw 37 which is adapted to be locked in adjusted position by lock nut 39.

With the chain 17 arranged, as shown in FIGURE 2 of the drawings, so that the chain extends around both the pinion gear 18 as well as the sheave 16, it is apparent that when the steering wheel 10 is rotated in a clockwise direction as indicated by the arrow in FIGURE 1, the pinion gear 18 will be rotated in a clockwise direction as well as the sheave 16. Thus, clockwise rotation of the steering wheel 10 will effect clockwise rotation of the sheave 16 and the wheel 14 will be turned for example to the right.

Should it be desired to change the direction of turning of the wheel 14 relative to clockwise direction of the steering wheel 10, the chain 17 is disengaged from the pinion gear 18 and reassembled therewith in the manner shown in FIGURE 4 of the drawings wherein the chain extends leaving a portion of said chain spaced from said periph-